May 1, 1956  C. H. WINTER, JR., ET AL  2,744,006
METHOD OF PRODUCING REFRACTORY METALS
Filed Nov. 8, 1951
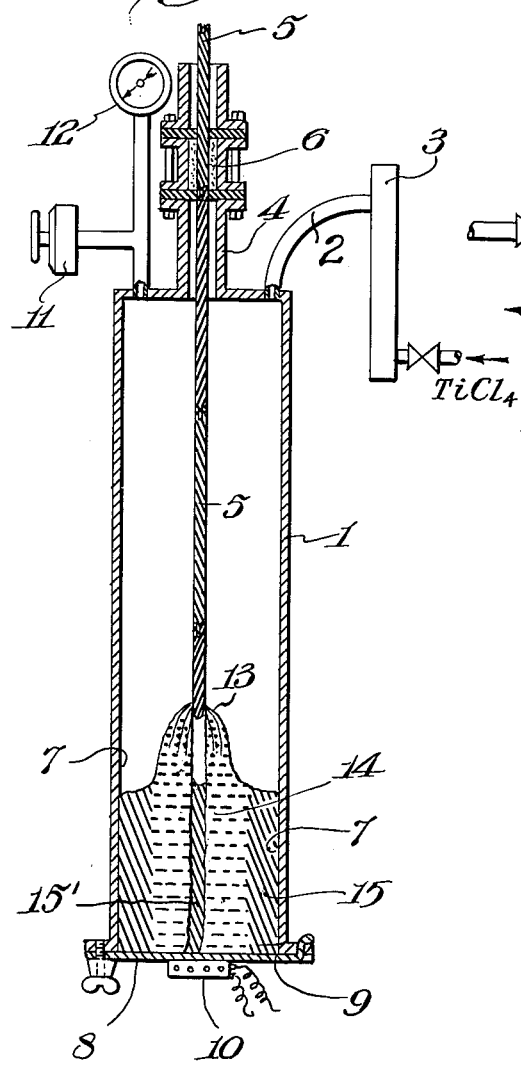
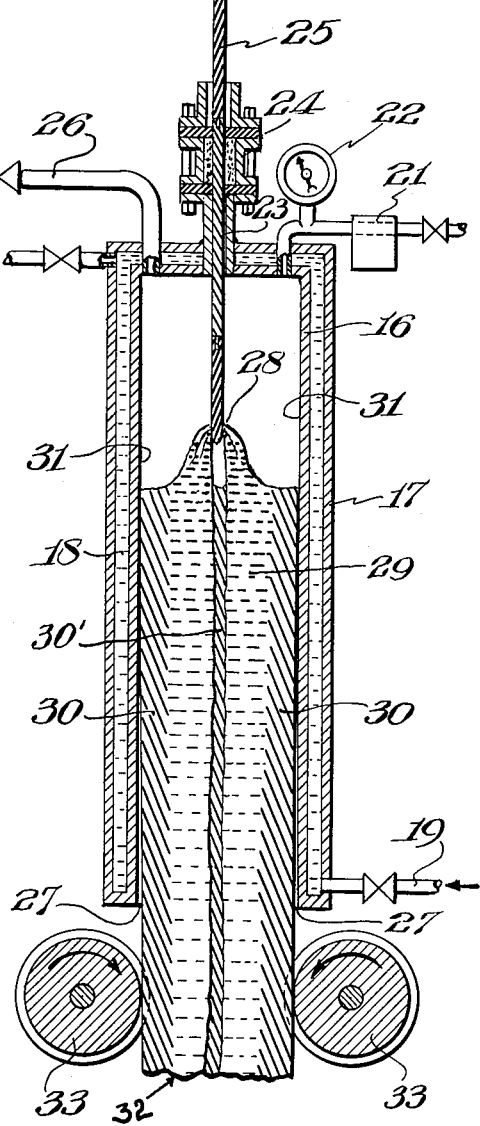
INVENTORS:
CHARLES H. WINTER, JR.,
and EVAN L. ANDERSON
BY John P. Hancock
ATTORNEY.

United States Patent Office 2,744,006
Patented May 1, 1956

2,744,006

METHOD OF PRODUCING REFRACTORY METALS

Charles H. Winter, Jr., and Evan L. Anderson, Wilmington, Del., assignors to E. I. du Pont de Nemours & Company, Wilmington, Del., a corporation of Delaware Application November 8, 1951, Serial No. 255,372

9 Claims. (Cl. 75—84)

This invention relates to the preparation of refractory metals from their volatile halides by reduction with a metallic agent. More particularly, it relates to titanium metal production by reduction of a volatile halide thereof at elevated temperatures with an active reducing metal. More specifically the invention provides an improved method for titanium tetrachloride reduction by means of chemical reaction with magnesium to recover titanium in relatively pure form.

The preparation of such metals as titanium, zirconium, columbium and tantalum, by reduction of various compounds thereof with relatively strong reducing agents is already known. In titanium production it is essential that the product be in relatively pure condition to insure necessary ductility for its many commercial applications. Most methods for obtaining this metal commercially involve the reduction of a halide thereof, such as $TiCl_4$, by an active metal such as magnesium, calcium, or sodium. This reaction is carried out as a batch type of operation from which air or water vapor is excluded. Examples of such prior procedures include those disclosed in U. S. Patents 2,148,345 and 2,205,854. When the reduction is completed, the sponge metal reaction product must be forcibly removed from the reactor, and throughout the reduction as well as in the subsequent purification operation an atmosphere of an expensive inert rare gas such as argon, helium, etc., must be maintained to prevent contamination of the titanium with oxygen or nitrogen as well as to modify the reaction rate. The high materials cost and operating difficulties attending these prior operations render unattractive their large-scale commercial exploitation.

It is among the objects of this invention to provide novel, improved processes and means for producing titanium and other refractory metals through reduction in a closed reaction vessel of a volatile halide of the metal with an active metallic reducing agent. A particular object is to provide a commercially useful method, of either the batch or continuous type, for manufacturing a refractory metal, especially titanium, in relatively high degree of purity and without encountering the lack of desired purity of product, difficulty of operation, and excessively high operating and other costs experienced in attempts to commercially adapt said prior methods. A further object is to provide a novel method for obtaining high purity titanium in the form of a relatively denser sponge reaction product and without recourse to the use of expensive inert rare gases during the reduction reaction. An additional object is to provide a relatively simple process which readily affords a substantial, usually three to five-fold increase in the capacity of equipment employed in the reduction operation as compared to feeding liquid magnesium. Other objects and advantages will be apparent from the ensuing description of the invention as well as from the accompanying diagrammatic drawings which are illustrative of certain useful forms of apparatus in which the invention can be carried out and wherein—

Fig. I is a side elevational, vertical, sectional view of one form of such apparatus; while Fig. II is a vertical, sectional view of a modified form thereof.

These and other advantageous objects are attained in this invention which comprises reducing a volatile metal halide in a closed reaction vessel with an active reducing metal, effecting said reduction at a temperature above the melting point of the reducing metal and by-product reaction salt which forms in the reaction, and during said reduction forcibly charging the reducing metal through an atmosphere of the halide reactant in the form of a substantially continuous, elongated solid which together with its reacting end portion is maintained within the reactor out of contact with the internal walls of said reactor, and the terminus or reactant end portion thereof is disposed and maintained in substantial proximity to the settled, solid reaction products formed in the reactor, and removing said reaction products to recover therefrom the desired metal product.

In a more specific and preferred embodiment, the invention comprises producing titanium metal by reducing titanium tetrachloride with magnesium in a closed reaction vessel, effecting the reaction in a restricted reaction zone in said vessel and at a temperature above the melting point of magnesium and by-product magnesium chloride evolved in the reduction, throughout said reduction reaction maintaining an atmosphere of vaporous $TiCl_4$ reactant in said vessel through which the reducing metal in the form of an elongated, substantially continuous, solid rod, stick or bar is forcibly charged downwardly to maintain the major portion thereof in such form and out of contact with the internal walls of said vessel with its reactant or lowermost depending end portion positioned at a point substantially immediately above and adjacent to the condensed products of reaction which form in said zone, maintaining the walls of said reaction vessel in cooled state and at a temperature between the melting point of the magnesium chloride and the condensation temperature of the titanium tetrachloride, continuously or intermittently withdrawing titanium metal and magnesium chloride products in solid form from the reaction vessel, recovering the titanium component from the withdrawn products and subjecting it to purification treatment.

Referring to the drawings and particularly to Fig. I, there is shown an elongated metal type of cylindrical or other form of reaction vessel 1 from which air or other undesired contaminating gases can be readily excluded during a contemplated reduction. Preferably said vessel is constructed of a corrosion-resistant metal or alloy which is relatively inert towards the reactants and reaction products at the temperatures and pressures employed in the reduction. A valved inlet conduit 2, provided with a convention measuring gauge 3, is disposed in the upper part of the vessel 1 through which a suitable metal halide reactant, such as titanium tetrachloride, in either liquid or vaporous condition, can be supplied to the reactor from a suitable source (not shown) in any desired, regulated rate and quantity. A separate inlet conduit 4 is also provided in the top portion of the reactor through which a reducing metal reactant 5 in the form of an elongated, substantially continuous solid rod, stick or bar can be manually or mechanically charged or forced, via a neoprene or other form of stuffing box or gland means 6 into the substantial central portion of the reactor 1 to extend downwardly therethrough for maintenance out of contact with the internal walls 7 during the reaction. A removable covering plate or other form of suitable closure means 8 is pivotally or otherwise secured for ready removal to the reactor bottom outlet 9, said closure means being provided with an associated electrical or other form of conventional heating means 10 for a purpose to hereinafter appear. A conventional venting element 11, such as a spring-loaded valve or rupture disc, is also provided in the upper portion of the reactor which element functions as a safety release for the system and as an outlet through which purging gases can be removed from the reactor prior to commencement of a reduction operation. A conventional pressure gauge 12 is also associated, as shown, with the venting means 11.

In producing, for instance, titanium metal in a apparatus of the type just described and through reaction, for example, of magnesium with titanium tetrachloride vapor, one can proceed as follows:

The reaction vessel 1 containing the centrally disposed, downwardly projecting magnesium insert rod 5 is sealed off from the atmosphere, its bottom plate 8 being secured in closed position over outlet 9. A small amount of vaporized $TiCl_4$ is then fed into the vessel through inlet 2 to purge and displace air or other contaminants therefrom, $TiCl_4$ addition being thereafter continued and at a rate which will maintain a substantially constant pressure of about 5 pounds per square inch gauge of that reactant during the reduction. The heating element 10 is then activated and when the center plate of closure element 8 attains a temperature of about 800° C., the rod 5 is lowered further through the vessel and the $TiCl_4$ atmosphere to position its tip or end portion against and in direct contact with the heated center plate. Lowering or adjusting of the rod to a desired position within the reactor can be effected by manually forcing or charging it through the close-fitting, leak-proof port or gland 6, or by means of associated mechanical equipment (not shown) adapted to actuate it automatically or otherwise and when a desired adjustment is required. Upon coming in contact with the hot plate, the lower end of the rod becomes heated to ignition temperature by absorption of heat and melting of such rod end portion thereupon occurs to initiate a reaction which is self-sustaining, once commenced, in main reaction zone 13 between the melted magnesium and $TiCl_4$ vapor. As the reaction proceeds, the end portion of the rod is consumed in said zone to compensate for which periodic or continuous manual or mechanical adjustment of the rod can be effected to maintain its lowermost point substantially within or in association with the reaction zone throughout the reduction. The products of reaction collect within the reactor under reaction zone 13, the metal product forming immediately thereunder below the rod 5 about a core 15' of $MgCl_2$ to build up within the vessel as a relatively restricted mound-like columnar mass or core 14 surrounded by the major portion of the by-product $MgCl_2$ which accumulates as a solidified mass 15 in the space formed between the peripheral limits of the core 14 and the internal walls 7 of the reactor. When, for example, a magnesium rod having a 1–1½" diameter is used, the titanium metal core 14 grows to about 6" in diameter and if, in conjunction therewith, a relatively large-size reactor is employed, the diameter of which ranges from, say, 5–6 times that of the rod, the pure $MgCl_2$ will advantageously flow into and fill the space formed between the outer limits of said core and the internal walls of the reactor. The process thus affords a unique segregation of reaction products not obtainable in prior methods and renders it physically possible to readily separate a major portion of the magnesium chloride from the titanium sponge by relatively simple procedures. This arises from the fact that formation of the titanium sponge in the form of a columnar mass and out of contact with the internal walls of the reactor facilitates removal and recovery of such sponge from the vessel since thereby one prevents the sponge from adhering to or "growing" upon the walls of the vessel. In addition, recourse to higher reaction temperatures can be advantageously resorted to in the reduction without the attendant risk of equipment destruction or contamination of the metal end product due to formation of low-melting titanium iron alloys which is encountered in prior procedures. Upon the mass 14 building up into the upper or top regions of the reactor, the reaction can be readily stopped by discontinuing further magnesium feed or by replacing the stream of $TiCl_4$ feed with an inert, protective gas such as argon or helium. The reactor and its reaction products content are cooled down and the solidified reaction products are withdrawn through outlet 9 after dropping or removing the plate 8. The outer or surrounding layer of solidified magnesium chloride is removed from the titanium metal core and the latter is then subjected to conventional purification treatment, such as vacuum distillation, to effect recovery of the pure titanium metal end product. The latter can be obtained in any desired form, either as an ingot or briquette or any suitable form adapted to render it capable of being sheeted, alloyed, or otherwise fabricated into an intended commercial use.

In the modification illustrated in Fig. II there is shown an adaptation of the invention as applied to a process of the type disclosed in the copending application Ser. No. 213,879, filed March 5, 1951, by C. H. Winter, Jr. In said copending application, titanium and other metals are continuously produced by reduction of their volatile halides in a closed reaction vessel and at temperatures in excess of the melting point of the reducing metal, the walls of the reactor during the reduction being subjected to external cooling for maintenance at a temperature below the melting point of the reaction by-product halide salt. The metal and halide products of reaction are withdrawn in solid ingot form from the bottom of the reactor either continuously or intermittently by suitable reacting rolls or other desired means. Recourse to an inert rare gas can be dispensed with in the process except at the molten reducing metal inlet where its use is necessary to prevent undesired reaction and consequent apparatus plugging at that point.

When, in accordance with this invention, resort is had to a continuous solid rod-like form of reducing metal reactant in the methods disclosed in said copending application Ser. No. 213,879, an advantageous increase of the reaction rates employing the same size reactor is obtained and recourse to expensive rare gas use can be entirely dispensed with.

Referring to Fig. II, there is shown a vertical, cylindrical, elongated type of metal reaction vessel 16 adapted to be maintained in closed, gas-tight relationship throughout a contemplated reduction. This vessel is preferably composed of corrosion-resistant metal and is provided with a spacedly disposed metal jacketing element 17 having a passage or channel 18 through which a suitable liquid or gaseous cooling fluid, particularly water, can be continuously passed for flow over the external surfaces of the vessel 1 after introduction into said passage through a valve-controlled inlet 19 for discharge therefrom through the valved outlet 20, whereby the walls and surfaces of said vessel can be maintained in desired relatively cool state or condition. A valved inlet means 21 leading into the interior of the reactor 16 is provided in the upper portion of the reactor 16 through which a suitable metal halide reactant can be charged at a desired rate to the system, said inlet means being also provided with a conventional pressure gauge 22 for regulating the pressure prevailing in the system. A separate inlet means 23 provided with an associated stuffing box or gland means 24 is also disposed in the upper, substantially central portion of the reactor, through which a suitable reducing metal 25, in the form of a continuous solid rod, stick or bar, can be manually or mechanically charged into the reactor for maintenance therein out of contact with the internal walls of the reactor. A conventional venting element 26 is also disposed on the top of the vessel 1 to function as a relief valve for the system and as an outlet for removing purging gases prior to commencement of a given reduction operation.

If desired, a suitable pressure gauge (not shown) can be associated with the said venting element 26. An outlet 27 is provided in the bottom of the reactor through which solid products of reaction can be withdrawn as desired from the system.

In practically adapting said Fig. II apparatus in this invention to obtain, for example, titanium metal by reaction of titanium tetrachloride with a metal such as magnesium, positioned within the reactor in the form of a continuous, downwardly projecting, movable rod 25, the starting operation can be undertaken as disclosed in said copending application Ser. No. 213,879. Preferably, however, a circular or other form of loosely fitting closure plate (not shown) is preliminarily mounted within the reactor and at a point where the initial reaction level is to exist. The unit is then heated by continuously flowing water or other suitable fluid at a temperature of 150-155° C. through the channel 18 of the jacketing element to preheat the reactor to a temperature above the boiling point of titanium tetrachloride. Admission of liquid titanium tetrachloride via inlet 21 is then effected and, following air purging, is thereafter continued so as to provide a slight pressure above atmospheric in the system during the reduction. The depending, centrally disposed rod 25 (electrically isolated by the gland element 24) after being lowered to a desired position within the reactor, is connected to a source of suitable electric current such as a welding machine, and reaction between the magnesium and TiCl₄ vapor is effected by striking an arc between said rod and the starting plate insert. The titanium reaction product initially formed strongly adheres to said plate, while by-product molten MgCl₂ flows out and freezes at its point of contact with the cooled reactor wall, thereby functioning to seal the reaction chamber and prevent further TiCl₄ escape. The reaction proceeds as described in connection with Fig. I, but as the reaction products build up on the insert plate, the latter is withdrawn to maintain a fairly constant reaction level. During such reaction, the end portion of the rod is consumed to require a periodic or continuous manual or mechanical adjustment thereof so as to maintain it within substantially the reaction zone 28. As in Fig. I the products of reaction collect below the latter, the metal component forming immediately below the rod 25 about a core 30' of MgCl₂ and building up in the vessel as a mound-like, columnar mass or core 29 surrounded by the major portion of MgCl₂ by-product 30 which accumulates in the space formed between the peripheral limits of the core 29 and the internal reactor walls 31. Due to the cooling action of the jacketing means, the by-product salt solidifies to form a retractible MgCl₂-Ti ingot 32 adapted to be continuously or intermittently withdrawn through the outlet 27 on removal of the insert plate and by means of roller or other type of retractor mechanism 33. Following withdrawal, the titanium metal core 29 is recovered from its surrounding layer of solidified MgCl₂ and the recovered core is then subjected to conventional purification treatment to effect recovery of the desired ductile titanium product.

To a clearer understanding of the invention, the following specific examples are given, these being merely in illustration but not in limitation of the invention.

*Example I*

TiCl₄ and Mg were reacted in a Fig. I type of apparatus the reaction vessel of which was 8' in height and had a 10" internal diameter and was suitably jacketed throughout its length to permit water at about 150° C. to be circulated over the reactor for purposes of maintaining the TiCl₄ reactant in the vapor state therein and a slight positive pressure within the vessel. The magnesium reactant was in the form of a continuous rod 1.3" in diameter extending downwardly through the center of the reactor and made up of a plurality of threaded section members screwed together prior to being fed to the system. The interior of the reactor at approximately 150° C. was first purged of moisture by circulating dry air therethrough, after which the air was displaced by TiCl₄ vapor added as liquid through the metering means. During this preparation the magnesium metal inlet was closed in gas-tight relationship by means of a first section of magnesium rod. The heating element carried by the bottom closure plate was activated and the central iron dish carried by said plate became heated to about 800° C. The magnesium rod was then lowered through the center of the reactor until its lowermost point or end portion was brought in direct contact with the hot dish. Melting of the tip of the rod then ensued and exothermic reaction occurred between the magnesium and TiCl₄ vapor. By maintaining a suitable pressure on the TiCl₄ fed to the meter, a substantially constant reactant pressure of about 3-5 pounds per square inch gauge prevailed within the system, the TiCl₄ reactant being automatically supplied thereto as needed. Upon melting of the tip of the magnesium rod, further magnesium addition was effected by manually forcing the added new sections through the magnesium metal inlet. An effort was made to feed the magnesium at a rate resulting in maximum TiCl₄ flow rate. By occasionally using the magnesium rod as a probe, it was determined that the maximum production rate was realized when the lower or reactive end of the rod was somewhat above the solid titanium metal product mass formed in the reactor. For example, when the rod was forced down against such solid product, the reaction rate became extremely slow. On the other hand, raising and maintaining the tip of the rod from about 5 to 15 inches resulted in a rapid reaction increase. On extreme raising of the tip, the reaction gradually decreased. During most of the two-hour run the tip of the rod was positioned in the area affording a maximum rate. Maximum TiCl₄ consumption could not be realized at all times due to the manner of feeding the Mg, but while the rod was maintained in such more reactive positions a feed rate of from 8 to 12 inches per minute (equivalent to from 40 to 60# Mg/hr.) was attained. During the run, 105 pounds of Mg and 396 pounds of TiCl₄ were consumed. At the end of the two-hour period, the reaction was quickly stopped by turning off further TiCl₄ addition and flooding the reactor with argon. Upon cooling of the reactor, the cooled reaction products, in the form of a cylindrical solid cake, were withdrawn therefrom by dropping the bottom plate. The upper portion of the cake presented a general cone-like shape with apparent evidence of semi-fluid connection existing between the unreacted solid portion of the rod and the product mass. The cake was about ten inches in diameter, a transverse section revealing a central core of titanium sponge approximately six inches in diameter surrounded by a layer of pure MgCl₂. The product cake, weighing 501 pounds, was placed in a vacuum retort, heated to melt and drain away approximately 75% of the MgCl₂ by-product. After draining, residual MgCl₂ and Mg were distilled from the sponge by heating to 1000° C. at 10 microns' pressure for ten hours. The final product consisted of 93.0 pounds of good quality, ductile titanium analyzing 99.5% Ti. This corresponds to a yield of 97% of the Ti from the TiCl₄ used. The 396 pounds of TiCl₄ used correspond theoretically to 101.5 pounds of Mg in a complete reduction reaction. Magnesium utilization in this reaction was therefore 101.5/105.0 or 97.0%. The apparently unused Mg was recovered in the distillate. The Ti production rate was 46.5#/hr. or 85.5#/hr. sq. ft. of reactor cross section.

*Example II*

Titanium metal was continuously produced by reacting TiCl₄ with a continuous stick of solid magnesium having a 3.5" diameter in a Fig. II type of apparatus. The cylindrical reaction vessel employed in the operation was 10' in height, had an internal diameter of 15", and a plurality of serrated retractor rolls was operatively associated with its bottom outlet to effect removal of the solidified products of reaction, either continuously or intermittently, and at any desired controlled rate, from the reactor. Prior to commencement of the operation, a cylindrical closure plate was mounted within the reactor and the unit was then heated by flowing water at 150° C. through the jacketing element. Liquid $TiCl_4$ was then fed into the reactor to displace air and provide a gauge pressure of about 3–5 pounds per square inch. Initiation of the reaction was effected by striking an arc between the magnesium rod and the closure or starting plate insert. As the reaction products build up on the starting plate, said plate is removed, the withdrawn solid cylindrical cake product being then engaged by the retractor rolls. When the operation had reached a steady rate, the $TiCl_4$ was consumed at 550 pounds per hour and the magnesium stick was charged to the system at an average of 4" per minute or 149 pounds magnesium per hour. Inspection of the recovered reaction products revealed substantially the same composition and quality of titanium sponge as that obtained in the procedures of Example I. The titanium sponge core was roughly 14" in diameter. Based on the ratio of $TiCl_4$ to magnesium used, the magnesium utilization was 95% of theory. An assay of the product showed that about 135 pounds of titanium per hour were produced, being equivalent to a 97% yield. This corresponds to approximately 110 pounds Ti per hour per square foot of reactor cross section.

In a comparable operation but in which recourse to a continuous form of solid magnesium metal reactant was not resorted to, a 94% titanium yield and a thirty-five pound Ti per hour per square foot of reactor cross section was realized.

*Example III*

Example II was repeated except that the reactor used was only 10" in diameter and the solid magnesium metal feed was effected by concurrently charging three 1.3" diameter magnesium rods through the reducing metal reactant inlet of the system. Optimum positioning of these reactant sticks within the reactor was somewhat difficult but upon probing with each stick and observing the overall $TiCl_4$ feed requirement, a production rate of 356 pounds of $TiCl_4$ per hour over a 40-minute period was realized. Magnesium consumption during this period was at a rate of 96 pounds per hour. By subjecting the corresponding portion of the product mass to vacuum distillation, a residue of 99.6% titanium metal was obtained weighing 58.1 pounds representing a production rate of 160 pounds per hour per square foot of reactor cross section. The yield of Ti therefore was 97% of theory, while the magnesium utilization was 95%.

Although described as applied to certain specific embodiments, the invention is obviously not limited thereto and many variations thereof can be resorted to without departing from its underlying principles and scope. Thus, while titanium is preferred for production under the invention, other metals, including zirconium, columbium, hafnium, tantalum, molybdenum, tungsten, and the like, can also be produced hereunder. In general, reaction temperatures approaching the boiling point of the by-product halide salt are obtained, with temperatures of from about 750–1400° C. arising when $TiCl_4$ is reduced with magnesium at atmospheric pressure. Other volatile metal halides the halogen component of which has an atomic number greater than 9, i. e., chlorine, bromine or iodine are contemplated for use. Of these, the chlorides are preferred, examples thereof including $TiCl_4$, $ZrCl_4$, $CbCl_5$, $MoCl_5$, $WCl_5$, $TaCl_5$, etc.

Similarly, because magnesium has a high reducing power per unit weight and is commercially readily available in relatively pure condition, it comprises a preferred form of useful reducing metal. However, other alkaline earth-type metals possessing melting points ranging from 651–850° C. or mixtures thereof can be charged in continuous, solid rod form into a reactor to remain in such form until their depending tip or end portion is melted in the main reaction zone. Examples in addition to magnesium, include calcium, barium, and strontium. Prior to employing the reducing metal for forcible feeding through the sealed, air-tight reactor inlet, it can be suitably extruded or cast into any desired continuous form, or, alternatively, can be made up of a plurality of preformed section members adapted to be united or coupled as by screw-threaded engagement with each other to form the continuous rod, stick or bar. Rods of relatively restricted, circular cross-section are normally most convenient for use but should an increased surface-to-volume ratio be desired, rods shaped to any extrudable cross-section can be employed. Thus, the rods, in cross-section, can be square, circular, triangular, thin rectangular, star, oval, serrated, etc., or can be in the form of an X, H, V, etc.

The means or manner of charging the continuing solid form of reducing metal into the reactor is not limited. As noted, the charging, especially in manufacturing high-quality, ductile titanium, is through an air-tight seal about the rod and the feeding can be effected by pushing or surging through manual, mechanical, or hydraulic means, either at a steady or varying rate, or intermittently. Advantageously, an accompanying rotary or oscillatory motion can be applied to the rod during the charging operation.

The position of the reacting end of the magnesium or other form of rod will be found to be quite critical with respect to the speed of the reaction. Thus, in titanium production when the rod is forced down against the set titanium sponge, and below the level of the magnesium chloride, the reaction rate becomes very slow. By raising the rod or awaiting its melting off, the reaction rate will advantageously increase and to a rate not heretofore realizable in equipment of equivalent size. On raising the rod or allowing the reactive end to be consumed so that the space between the end of reacting magnesium rod and the $MgCl_2$ level is increased, the $TiCl_4$ consumption rate passes through a maximum and decreases.

Again, while use of a single form of reducing metal rod has been exemplified, obviously resort can be made to a multiple or plurality of such rods and with beneficial effects, as well as to mixtures of the various reagents contemplated for use herein.

Although the invention is operatively useful in either a batch, continuous, or semi-continuous type of operation, it is particularly adapted to a continuous method. In such method addition of reducing metal and metal halide reactants can be effected simultaneously with withdrawal of the resulting reaction products in solid form being continuously effected. In the preferred titanium production, the frozen magnesium chloride reaction product shrinks slightly due to the cooling which the cooled reactor walls exert and permits use of an open-bottomed reactor and withdrawal of a solidified, retractible ingot containing a core of solidified titanium metal. This cooling, as contemplated in said copending application Ser. No. 213,879, is conducted throughout the reduction reaction to maintain the active reaction zone out of contact with the reactor surfaces and by maintaining the walls of the reactor, particularly those adjacent the reaction zone where the heat of reaction is liberated and within which the reactant metal chloride vapor and reducing metal are retained, at a temperature below the melting point of the $MgCl_2$ or other metal halide by-product and above, preferably, the condensation point of the $TiCl_4$ or other metal chloride reactant. As noted, this is accomplished by circulating or evaporating water, or other desired, useful coolant or heat transfer fluid, through channel 18 of the jacketing element. Alternatively, the cooling can be effected by resorting to simple circulation of water under pressure or by passing a suitable coolant, either as a liquid spray or air blast, at the desired temperature, over or against the external walls or surfaces of the reactor. To assist and promote desired heat transfer, suitable radial fins or other forms of heat-dissipating means can be associated with the reactor.

As already indicated, the reaction between the metal reducing agent and the vaporous metal halide takes place at the terminus or lower end of the metal feed rod which is maintained immediately above the settled reaction products. Accordingly, there exists a zone of reaction surrounding the end of the rod above the metal reaction product. The feed rod is constantly being lowered into the reaction vessel as it is being consumed. Obviously, it is not necessary that the rod be maintained in a vertical position therein since it can be fed downwardly therethrough and at an angle to the vertical, if desired, but the reacting end is suitably maintained away from the vertical wall of the reactor to avoid contact with the reactor walls and prevent the reaction from occurring thereon. Cooling of such walls and the resulting loss of heat may induce a slowing down of the reaction if such reaction zone extends to the wall. This reaction zone reaches temperatures which may approach the boiling point of the metal halide by-product (1410° C. in the case of $MgCl_2$). In any event, the reaction zone has a temperature in excess of the melting point of the metal being consumed and is frequently at or above the boiling point of the metal reducing agent. In some instances it may reach the boiling point of the by-product metal halide when the reaction is proceeding in a vigorous manner.

The products of the reaction collect within the reactor under reaction zone 13, the metal product forming immediately thereunder below the continuous reducing metal rod, surrounded by the major portion of the by-product metal halide. A central core of titanium metal in sponge form builds immediately under the reacting magnesium rod when titanium tetrachloride and magnesium comprise the reactants, magnesium chloride collecting in the annular space surrounding the titanium core. Thus, the invention provides a unique method for segregating the products of reaction which is not obtainable in prior procedures and permits ready separation and removal of a major portion of the magnesium chloride from the titanium sponge by simple means.

During the course of the reaction between magnesium and titanium tetrachloride vapors, the titanium sponge builds up, as already noted, in a mound-like form within the reactor and above the liquid $MgCl_2$ by-product. This affords a more efficient draining of the magnesium chloride from the metal.

It is understood that while my improved process is suitable for use at normal pressure it is not limited thereto and that sub- or superatmospheric pressures can be resorted to, if desired. A slight positive pressure within the reaction chamber is preferred to avoid in-leakage of air and consequent contamination of the product with oxygen and nitrogen.

In addition to the high production rate, this method has other advantages such as the elimination of the expensive rare gas employed with liquid magnesium feed. The magnesium may be fed in relatively pure form as compared with molten magnesium which picks up iron by contact with ferrous alloys commonly used. The product metal sponge may be kept from contaminating contact with the reactor wall by using a reactor of greater diameter than that of the sponge core deposited in the reaction.

No thorough theoretical explanation is presently known as to why the novel method of feeding the reducing metal to a reactor in accordance with this invention affords the superior advantages and unexpected results which its practice provides. The limited observations made through rod probing demonstrate that the higher reaction rates result when the lower or reacting end is raised from one to ten inches above the more rigid sponge product. This was found in the case of magnesium rods of from .65 to 3.5 inches in diameter and in reactors having from 6 to 15 inch diameters. It appears that with widely varying reactor and stick sizes this optimum distance between the end of the stick and the rigid sponge product will vary considerably. For a given apparatus there appears to exist in titanium metal manufacture a distance from the solid end of the Mg stick to the level of the magnesium chloride by-product which corresponds to a maximum rate of titanium production. When the stick is plunged downward, it is apparently quenched by submersion in the products of the reaction and access of $TiCl_4$ to the Mg is prevented. On the other hand, when the rod is raised relatively high above the reaction products and zone 13, say, several feet, the Mg continues to react and melt but a large portion drops in molten masses to the surface of the reaction products where it reacts at a lower rate. Apparently, when the magnesium rod is in an optimum position, a mobile shroud of fresh, finely divided titanium and magnesium chloride liquid extends from the rod to the rigid portion of the sponge product. This shroud keeps slumping, but at the same time localizes the reaction heat so that the magnesium is vaporized and forced through to react with the titanium tetrachloride in the vapor phase. This description is based on the appearance of the reactants after quenching reactions with argon, and cooling. It is not, therefore, proposed as an accurate picture of the conditions during the main course of the reaction. Whatever the conditions, this method of feeding shows higher production rates with better yields and magnesium utilization than other known methods of feeding.

In the practice of this invention it is found convenient to use the upper portion of the established product metal core as a reference point from which to gauge the position of the reducing metal stick. The core can be observed by probing whereas the liquid by-product salt cannot. The reacting end of the magnesium rod, in the instance of reducing $TiCl_4$, may be advantageously positioned in the range of from one to 10 diameter above the established product metal core exclusive of the relatively fragile shroud of products which may cling to or hang from the rod. When using rods of from one to five inches in diameter or other bars of equivalent cross-sectional area the position for optimum reaction is found within the range of from one to about 30 inches above the established product metal core.

We claim as our invention:

1. A process for producing a refractory metal selected from the group consisting of titanium, zirconium, hafnium, columbium, molybdenum, tungsten and tantalum, which comprises reacting, at temperatures ranging from about 750–1400° C., an alkaline earth reducing metal selected from the group consisting of magnesium, calcium, barium and strontium, with a volatile halide of said refractory metal, the halogen component of which has an atomic number above 9, effecting the reaction within a closed reactor having a reaction zone maintained out of contact with the internal walls of said reactor, during the reaction forcibly charging the reducing metal in the form of a continuous, elongated solid into said reactor and an atmosphere of the volatile halide reactant present therein, maintaining the same out of contact with the reactor internal surfaces and the reactant end portion thereof in said reaction zone and in substantial proximity to and above the refractory metal reaction product being formed and deposited in the reactor, subsequently removing said product from said reactor and subjecting it to purification treatment.

2. A method for producing a refractory metal selected from the group consisting of titanium, zirconium, hafnium, columbium, molybdenum, tungsten and tantalum which comprises reducing a volatile halide of said metal the halogen component of which has an atomic number greater than 9 with an alkaline earth reducing metal selected from the group consisting of magnesium, calcium, barium, strontium within a reactor the reaction zone of which is maintained out of contact with internal walls of said reactor at a temperature ranging from about 750–1400° C. during the reduction reaction forcibly charging the reducing metal in continuing, relatively restricted, solid rod-like form downwardly into said reactor and an atmosphere of the halide reactant maintained therein, maintaining the solid metal rod within the reactor out of contact with the internal walls thereof and to a point substantially adjacent to said reaction zone; and above the level of the molten halide reaction by-product formed in the reduction, recovering the metal reaction product from said reactor and subjecting it to purification treatment to obtain the final metal product.

3. A method for producing a refractory metal selected from the group consisting of titanium, zirconium, hafnium, columbium, molybdenum, tungsten and tantalum which comprises reducing a volatile halide of said metal the halogen component of which has an atomic number greater than 9 with an alkaline earth reducing metal selected from the group consisting of magnesium, calcium, barium, strontium within a reactor the reaction zone of which is maintained out of contact with the internal walls of said reactor at a temperature ranging from about 750–1400° C. during the reduction reaction maintaining the walls of the reactor at a temperature below the melting point of said by-product salt, forcibly charging the reducing metal in continuing, relatively restricted, solid rod-like form into said reactor and an atmosphere of the halide reactant maintained therein, maintaining the solid metal rod within the reactor out of contact with the reactor internal walls and to substantially above and adjacent to said reaction zone and the level of the molten halide reaction by-product formed in the reduction, recovering the metal reaction product from said reactor and subjecting it to purification treatment to obtain the final metal product.

4. A method for producing a refractory metal selected from the group consisting of titanium, zirconium, hafnium, columbium, molybdenum, tungsten and tantalum which comprises reducing a volatile chloride of said metal with an alkaline earth metal selected from the group consisting of magnesium, calcium, barium and strontium within a reactor the reaction zone of which is maintained out of contact with the internal walls of said reactor at an elevated temperature ranging from about 750–1400° C., during the reduction reaction forcibly charging the reducing metal reactant in continuing, relatively restricted, solid rod-like form into said reactor and an atmosphere of the vaporous metal chloride reactant, maintaining the solid metal rod within said reactor out of contact with the reactor internal walls and above and adjacent to said reaction zone and the level of the molten metal chloride reaction product which forms in the reduction, recovering the metal reaction product from said reactor and subjecting it to purification treatment to obtain the final metal product.

5. A method for producing a refractory metal selected from the group consisting of titanium, zirconium, hafnium, columbium, molybdenum, tungsten and tantalum which comprises reducing a volatile chloride of said metal with an alkaline earth metal selected from the group consisting of magnesium, calcium, barium and strontium within a closed reactor the reaction zone of which is maintained out of contact with the internal walls of said reactor at an elevated temperature ranging from 750–1400° C., during the reduction maintaining the walls of said reactor at a temperature below the melting point of the by-product metal chloride salt which is formed in the reduction, forcibly charging the reducing metal into the reactor in the form of a solid, movable, downwardly projecting rod of relatively restricted cross section and an atmosphere of the metal chloride reactant which is maintained therein, maintaining said rod within the reactor out of contact with the internal walls of the latter and the end portion of said rod at a point within said reaction zone and immediately above and in proximity to the solid metal reaction product formed in the reactor subsequently withdrawing said product from the reactor and subjecting it to purification treatment to obtain the final metal product.

6. A method for producing a refractory metal selected from the group consisting of titanium, zirconium, hafnium, columbium, molybdenum, tungsten and tantalum which comprises reducing a volatile chloride of said metal with an alkaline earth metal selected from the group consisting of magnesium, calcium, barium and strontium within a reactor having a reaction zone maintained out of contact with the internal walls of said reactor at an elevated temperature ranging from about 750–1400° C., throughout the reduction reaction externally cooling and maintaining the walls of the reactor at a temperature below the melting point of the by-product metal chloride salt which forms in the reduction, forcibly charging said reducing metal as a continuing, relatively restricted solid, movable rod downwardly into the reactor and into an atmosphere of the vaporized metal chloride reactant, maintaining said rod out of contact with the internal walls of the reactor and its depending end portion within said reaction zone and at a point immediately above the solid metal reaction product formed in the reduction reaction, withdrawing said solid metal reaction product from the reactor and subjecting it to purification treatment to obtain the final metal product.

7. A method for producing titanium metal which comprises reducing titanium tetrachloride with magnesium within a closed reactor the reaction zone of which is maintained out of contact with the internal walls of said reactor at substantially atmospheric pressure and temperatures ranging from 750–1400° C., during the reduction reaction maintaining the walls of the reactor at a temperature below the melting point of the magnesium chloride by-product formed in the reduction, forcibly charging the magnesium metal reactant in continuing, relatively restricted solid rod-like form into said reactor and an atmosphere of the vaporized titanium tetrachloride reactant which is continuously maintained therein, maintaining said solid magnesium metal rod within the reactor out of contact with the internal walls of the latter with its reactant end portion within said reaction zone and above the level of the solid titanium metal sponge reaction product and molten magnesium chloride by-product, recovering the titanium metal sponge reaction product from said reactor and subjecting it to purification treatment to obtain the desired titanium metal.

8. A continuous process for producing titanium metal which comprises reducing titanium tetrachloride with magnesium metal within a closed reactor the reaction zone of which is maintained out of contact with the internal walls of said reactor at substantially atmospheric pressure and a temperature ranging from 750–1400° C., during said reduction externally cooling and maintaining the walls of said reactor at a temperature below the melting point of the magnesium chloride by-product formed in the reduction, forcibly charging the reducing metal in the form of a continuing, relatively restricted solid rod downwardly into said reactor and an atmosphere of the titanium tetrachloride reactant, maintaining the rod in such solid form within said reactor but out of contact with its internal walls and the lower end portion of said rod in said reaction zone and at a point immediately above but in proximity to the solid titanium metal reaction product formed within the reactor, continuously withdrawing solidified products of reaction from said reactor and subjecting the titanium metal sponge component thereof to purification treatment to obtain the final metal product.

9. A process for the production of titanium metal by reduction of titanium tetrachloride with magnesium in a reaction zone of a closed reaction vessel at substantially atmospheric pressure and a temperature ranging from 750–1400° C. which comprises feeding said magnesium reactant downwardly in solid rod-like form through the substantial center of and into said vessel and an atmosphere of vaporous titanium tetrachloride maintained therein, maintaining said solid magnesium reactant and reaction zone in said vessel, out of contact with the latter's internal walls, maintaining said walls at a temperature below the melting point of the magnesium chloride by-product formed in the reduction, positioning the tip end of said solid downwardly extending rod within said zone and adjacent to and above a mound-like, columnar mass of titanium sponge reaction product formed within said vessel maintained above the level of the magnesium chloride present, withdrawing solidified products of reaction from the bottom of said vessel and subjecting the titanium component thereof to purification treatment.

References Cited in the file of this patent

UNITED STATES PATENTS

| | | |
|---|---|---|
| 543,115 | Uehling | July 23, 1895 |
| 2,076,067 | Cooper | Apr. 6, 1937 |
| 2,084,978 | Seil | June 22, 1937 |
| 2,091,087 | Wempe | Aug. 24, 1937 |
| 2,361,382 | Camin | Oct. 31, 1944 |
| 2,564,337 | Maddex | Aug. 14, 1951 |
| 2,567,838 | Blue | Sept. 11, 1951 |
| 2,621,121 | Winter | Dec. 9, 1952 |

FOREIGN PATENTS

| | | |
|---|---|---|
| 386,621 | Great Britain | Feb. 16, 1933 |

OTHER REFERENCES

Journal of Metals, April 1950, pages 634–640, inclusive.